United States Patent
Kado

(10) Patent No.: US 9,877,003 B2
(45) Date of Patent: Jan. 23, 2018

(54) IMAGE PROJECTION APPARATUS, METHOD OF CONTROLLING IMAGE PROJECTION APPARATUS, AND STORAGE MEDIUM

(71) Applicant: Takahiro Kado, Kanagawa (JP)

(72) Inventor: Takahiro Kado, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 300 days.

(21) Appl. No.: 14/856,966

(22) Filed: Sep. 17, 2015

(65) Prior Publication Data
US 2016/0105654 A1    Apr. 14, 2016

(30) Foreign Application Priority Data

Oct. 9, 2014    (JP) .................................. 2014-208045

(51) Int. Cl.
| | |
|---|---|
| *H04N 9/31* | (2006.01) |
| *G02B 26/08* | (2006.01) |
| *G09G 5/10* | (2006.01) |
| *G02B 26/02* | (2006.01) |
| *G09G 3/00* | (2006.01) |
| *G09G 3/34* | (2006.01) |

(52) U.S. Cl.
CPC ....... *H04N 9/3182* (2013.01); *G02B 26/0833* (2013.01); *G09G 3/002* (2013.01); *H04N 9/312* (2013.01); *H04N 9/317* (2013.01); *G02B 26/02* (2013.01); *G09G 3/346* (2013.01); *G09G 2320/0653* (2013.01); *G09G 2320/0693* (2013.01)

(58) Field of Classification Search
CPC ...... H04N 9/3182; H04N 9/317; H04N 9/312; G09G 3/002; G09G 2320/0693; G09G 2320/0653; G09G 3/346; G02B 26/0833; G02B 26/02
See application file for complete search history.

(56) References Cited

U.S. PATENT DOCUMENTS

| | | | | |
|---|---|---|---|---|
| 6,734,957 B2 * | 5/2004 | Schmidt | .................... | G01J 1/42 |
| | | | | 348/E17.005 |
| 7,133,022 B2 * | 11/2006 | Grabert | .............. | G02B 26/0833 |
| | | | | 345/156 |
| 9,106,811 B2 * | 8/2015 | Tan | .................... | H04N 13/0007 |
| 2009/0284544 A1 * | 11/2009 | Nobori | ................. | G09G 3/3406 |
| | | | | 345/589 |

(Continued)

FOREIGN PATENT DOCUMENTS

| | | |
|---|---|---|
| JP | 2006-010945 | 1/2006 |
| JP | 2008-304943 | 12/2008 |

*Primary Examiner* — Andrew Sasinowski
(74) *Attorney, Agent, or Firm* — Harness, Dickey & Pierce, P.L.C.

(57) ABSTRACT

An image projection apparatus includes a light source to emit light, a light modulator to modulate intensity of the light emitted from the light source for generating a projection image, and an image luminance controller to control the light modulator to maintain brightness of the projection image projected on a projection face at a substantially constant level during a given time period of the image projection apparatus. The given time period is from one time point when power supply to the image projection apparatus is started to another time point when a power level for driving the light source is increased to a given power level.

11 Claims, 8 Drawing Sheets

(56) References Cited

U.S. PATENT DOCUMENTS

| | | | |
|---|---|---|---|
| 2010/0321417 A1* | 12/2010 | Iisaka .................. | G09G 3/3413 345/690 |
| 2011/0175925 A1* | 7/2011 | Kane ........................ | G01J 1/42 345/589 |
| 2015/0015470 A1* | 1/2015 | Jiko ....................... | G09G 3/001 345/88 |

* cited by examiner

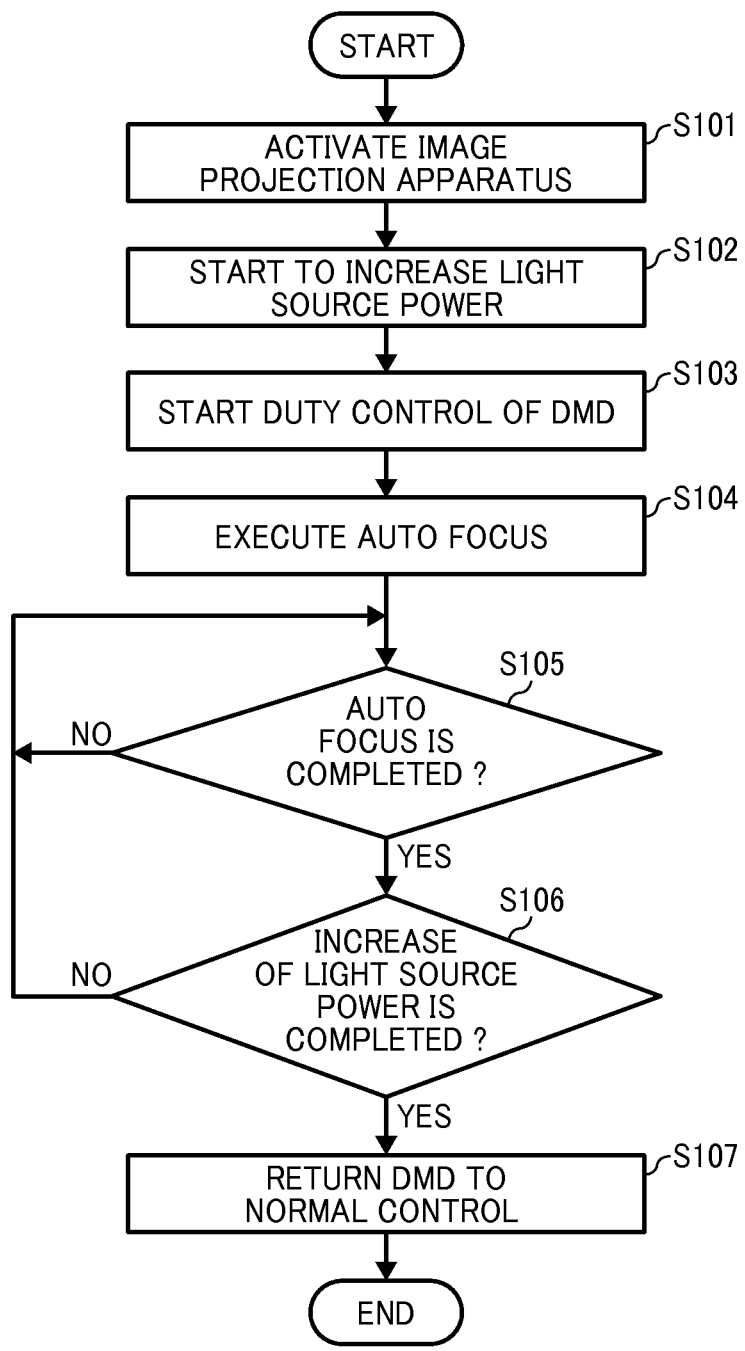

IMAGE PROJECTION APPARATUS, METHOD OF CONTROLLING IMAGE PROJECTION APPARATUS, AND STORAGE MEDIUM

CROSS-REFERENCE TO RELATED APPLICATION

This application claims priority pursuant to 35 U.S.C. §119(a) to Japanese Patent Application No. 2014-208045, filed on Oct. 9, 2014 in the Japan Patent Office, the disclosure of which are incorporated by reference herein in their entirety.

BACKGROUND

Technical Field

The present invention relates to an image projection apparatus, and a method of controlling an image projection apparatus, and a storage medium of program.

Background Art

Image projection apparatuses known as projectors have been widely used with the advancement of higher resolution of liquid crystal panels, enhancement of brightness of lamps due to higher efficiency, and lower price. Further, light-weight and compact image projection apparatuses using digital micro-mirror devices (DMD) as an image generation element have been widely used in offices, schools, and homes.

The image projection apparatuses can employ various lamps as a light source. For example, an arc lamp such as high pressure mercury lamp can be used. When the high pressure mercury lamp is used as the light source, the image projection apparatus requires several minutes to set desired brightness for a projection image to be projected by the image projection apparatus. Specifically, it takes about several minutes from a time point of supplying power to the image projection apparatus to a time point of activating the light source with a given driving power level, in which brightness of projection image becomes gradually brighter until the projection image is being projected with desired brightness. Hereinafter, this time period may be referred to warming-up mode.

Further, when the image projection apparatus is set on a given place, a suitable focus position of the image projection apparatus varies depending on the distance between the image projection apparatus and a projection face (e.g., screen). Therefore, the focus position is required to be adjusted depending on the distance between the image projection apparatus and the projection face. For example, the focus adjustment can be conducted automatically using a sensor, which is known as the auto focusing capability of the image projection apparatus. The auto focusing control operation can be performed by projecting a pattern image for the focus adjustment from the image projection apparatus, and capturing the projected pattern image by a camera of the image projection apparatus.

When the auto focusing control operation is performed based on a captured image of the projected pattern image, it is preferable to reduce or suppress fluctuation of the brightness of projection image. For example, as to conventional projectors, a pattern image projected on a screen is captured by a camera, and then the auto focusing control operation is performed based on an image captured by the camera, in which a driving waveform of a light source during the focus adjustment mode and a driving waveform of the light source during the normal operation mode are set differently to maintain brightness of image data of the projected pattern image used for the auto focusing control operation at a substantially constant level.

When the auto focusing control operation is performed by capturing the pattern image, the auto focusing adjustment is preferably performed during the warming-up mode of the image projection apparatus to reduce the time of completing the activation of the image projection apparatus. However, since the brightness of projection image fluctuates (i.e., brightness is not a substantially constant level.) during the warming-up mode, the pattern image cannot be captured correctly, and thereby the auto focusing adjustment cannot be performed effectively.

SUMMARY

In one aspect of the present invention, an image projection apparatus is devised. The image projection apparatus includes a light source to emit light, a light modulator to modulate intensity of the light emitted from the light source for generating a projection image, and an image luminance controller to control the light modulator to maintain brightness of the projection image projected on a projection face at a substantially constant level during a given time period of the image projection apparatus. The given time period is from one time point when power supply to the image projection apparatus is started to another time point when a power level for driving the light source is increased to a given power level.

In another aspect of the present invention, a method of controlling an image projection by an image projection apparatus is devised. The method includes the steps of emitting light from a light source, modulating intensity of the light emitted from the light source for generating a projection image, and controlling brightness of the projection image projected on a projection face at a substantially constant level during a given time period of the image projection apparatus. The given time period is from one time point when power supply to the image projection apparatus is started to another time point when a power level for driving the light source is increased to a given power level.

In another aspect of the present invention, a non-transitory computer-readable storage medium storing a program that, when executed by a computer, causes the computer to execute a method of controlling an image projection by an image projection apparatus is devised. The method includes the steps of emitting light from a light source, modulating intensity of the light emitted from the light source for generating a projection image, and controlling brightness of the projection image projected on a projection face at a substantially constant level during a given time period of the image projection apparatus. The given time period is from one time point when power supply to the image projection apparatus is started to another time point when a power level for driving the light source is increased to a given power level.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a flow chart showing the steps of a process of controlling an auto focusing control operation during a warming-up mode of the image projection apparatus under a condition of maintaining brightness of projection image at a substantially constant level;

Figure 1:
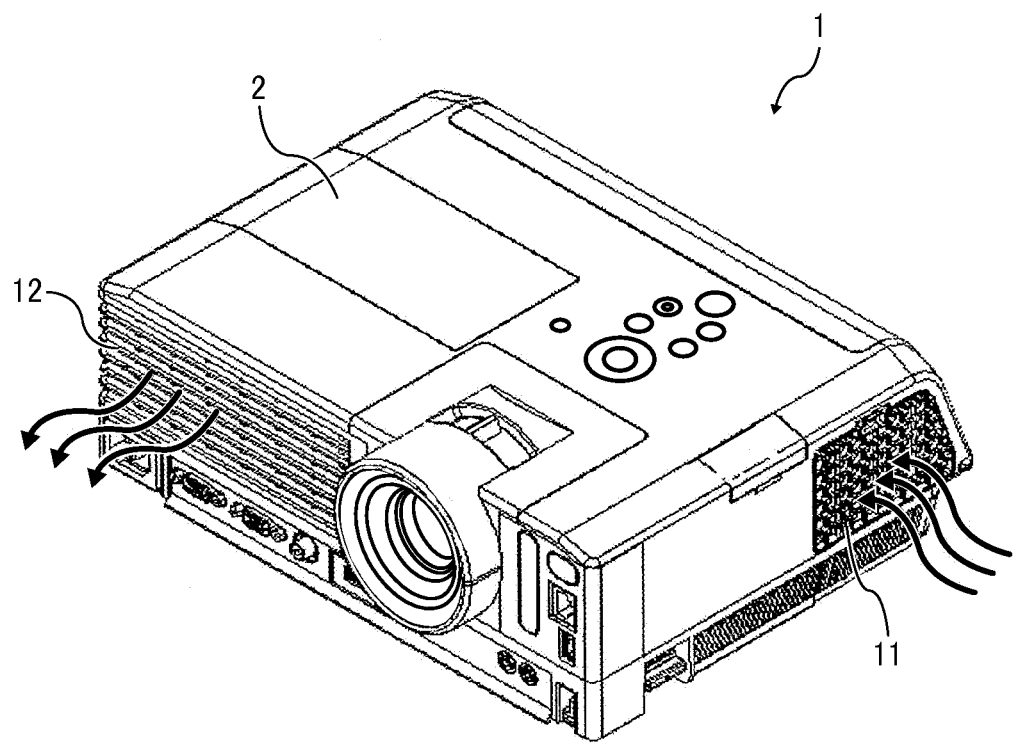
FIG. 1 is a perspective view of an image projection apparatus according to one or more example embodiments.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

A description is now given of an image projection apparatus according to one or more example embodiments with reference to FIGS. 1 to 7.

An image projection apparatus 1 according to one or more example embodiments includes, for example, a light source, a light modulator, and an image luminance controller. For example, the light source (hereinafter, light source 4a) employs, a high pressure mercury lamp to emit light. The light modulator (hereinafter, light modulator 40, DMD element 10a) modulates intensity of light emitted from the light source 4a to generate an image light. The image luminance controller (hereinafter, luminance controller 23, image controller 22) controls image luminance to maintain brightness of a projection image projected on a projection face at a substantially constant level during a given time period such as from "t1" to "t2" in FIG. 7 starting from a time point ("t1" in FIG. 7) when the power supply to the image projection apparatus 1 is started to a time point ("t2" in FIG. 7) when the light source 4a is started to be driven by a given driving power level such as a normal driving power level. Hereinafter, the given time period (see "t1" to "t2" in FIG. 7) is referred to as a warming-up mode used for a warming-up operation of the image projection apparatus 1.

In this description, "luminance" means intensity of light [cd/m2] being output from the image projection apparatus, "illuminance" means intensity of light [lx] being projected on a projection face such as a screen. Further, "brightness" of projection image means apparent brightness of a projection image projected on the projection face.

Configuration of Image Projection Apparatus

Figure 2:
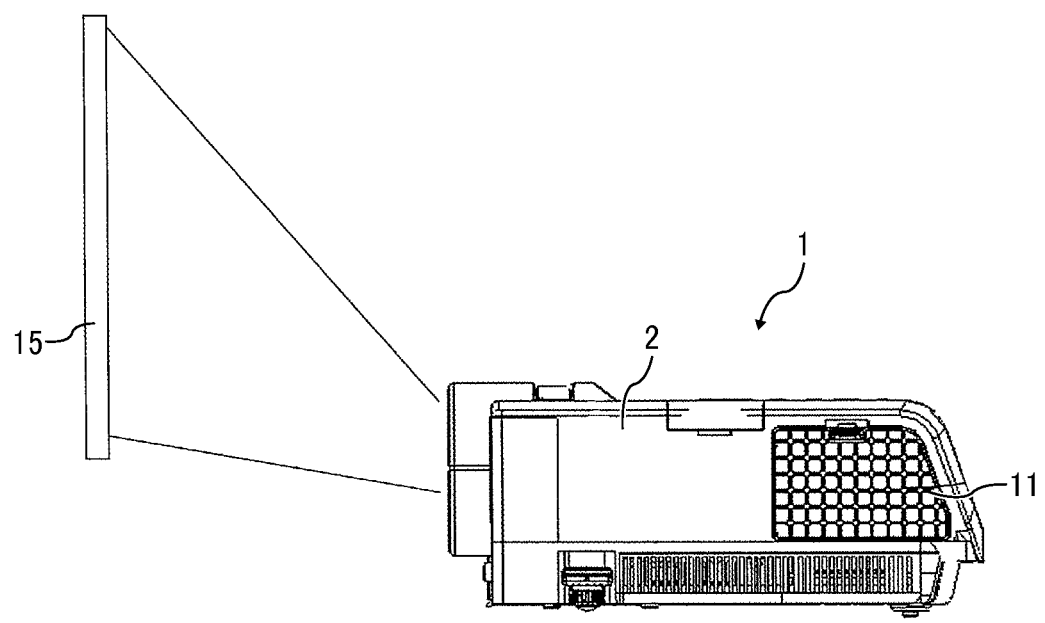
FIG. 2 is a side view of the image projection apparatus, and a projection condition of a projection image on a projection face.

FIG. 1 is a perspective view of the image projection apparatus 1 according to one or more example embodiments, and FIG. 2 is a side view of the image projection apparatus 1, and a projection condition of a projection image on a screen 15 used as the projection face.

The image projection apparatus 1 is a projector that generates images based on image data input from an information processing apparatus such as a personal computer (PC), and an image capturing apparatus such as a video camera, and projects the generated images on the screen 15. The generated images include still image data and movie image data with or without audio data.

The image projection apparatus 1 includes, for example, the light source 4a such as a lamp, and a number of electronic circuits therein. Therefore, temperature inside the image projection apparatus 1 increases when the image projection apparatus 1 is activated. The image projection apparatus 1 includes an air-intake port 11 and an exhaust port 12 so that the temperature inside the image projection apparatus 1 does not exceed heat-resistance temperature of internal components.

Figure 3A:
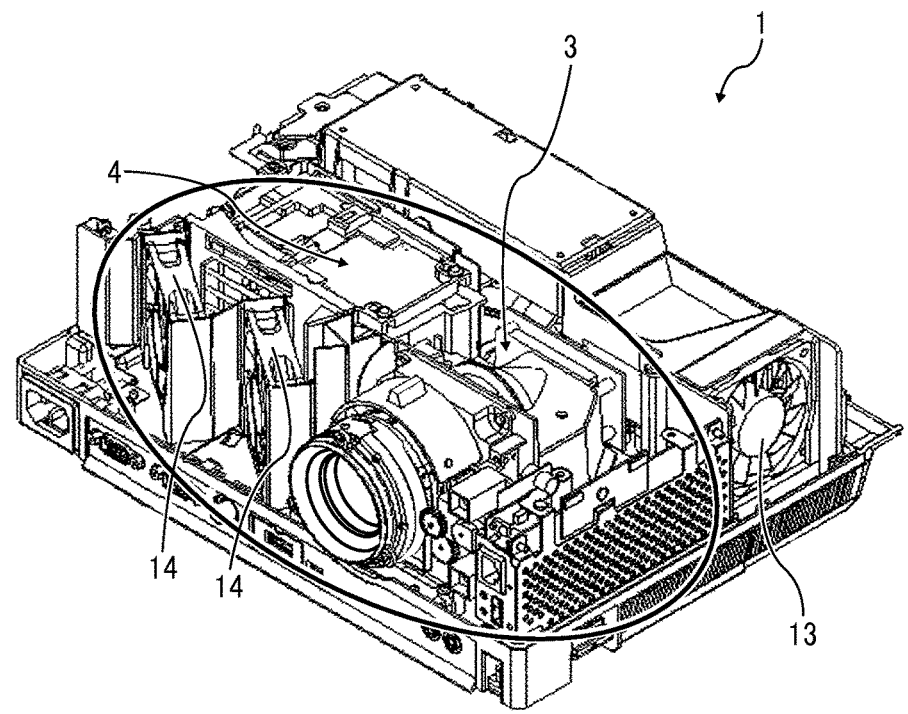
FIG. 3A is a perspective view of the image projection apparatus, in which an outer cover is removed to expose internal parts.
Figure 3B:
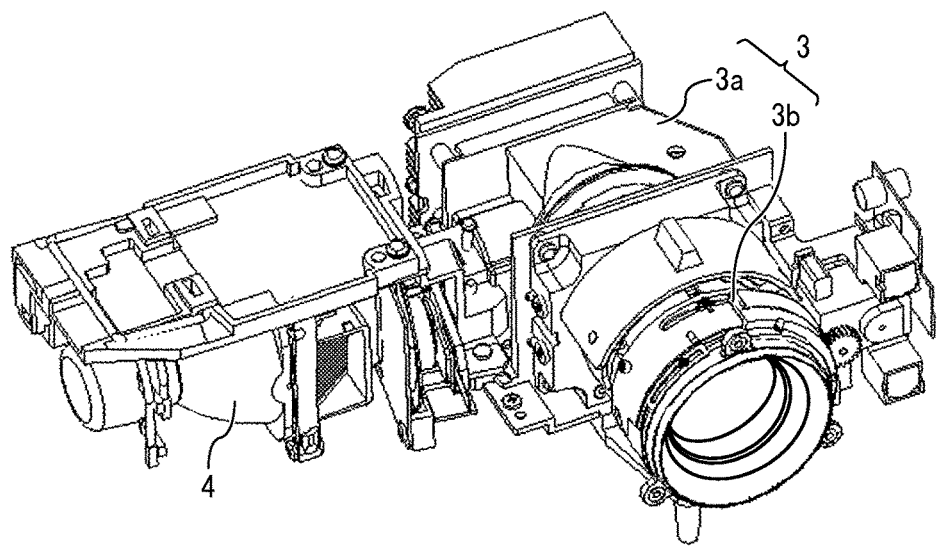
FIG. 3B is an expanded view of an optical engine and a light source unit indicated by a circular line in FIG. 3A.
Figure 4:
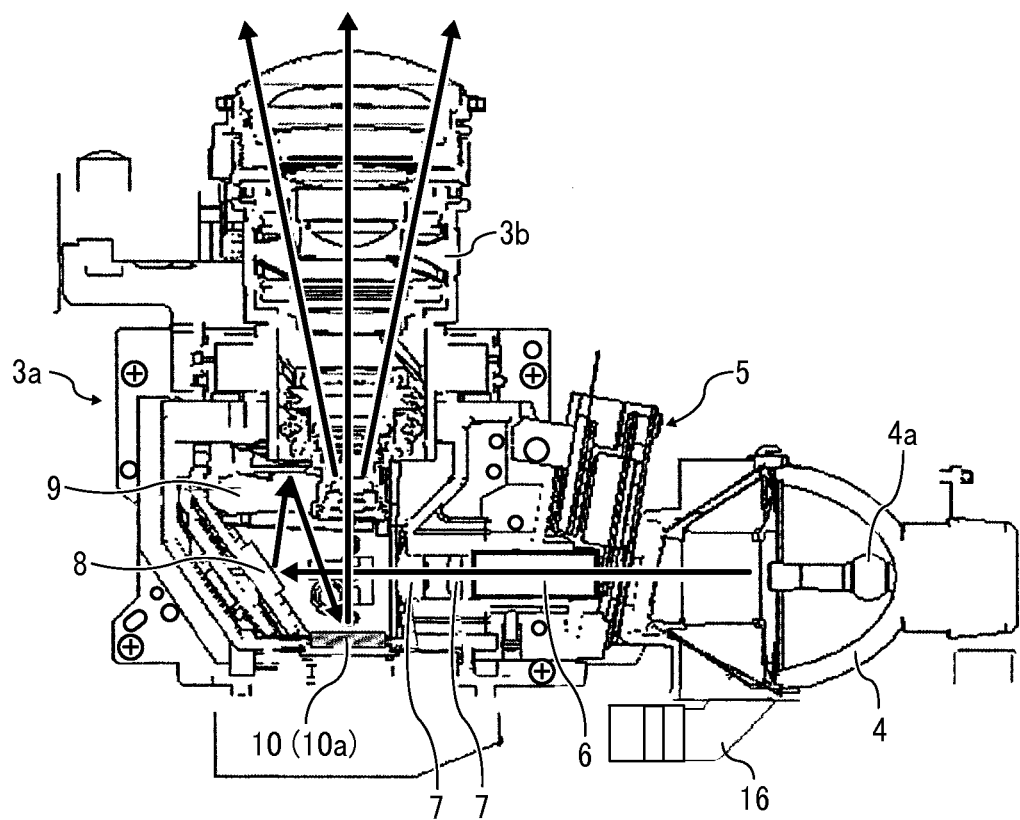
FIG. 4 is a schematic cross-sectional view of a lighting unit, a projection unit, and a light source unit.

FIG. 3A is a perspective view of the image projection apparatus 1, in which an outer cover 2 is removed to expose internal parts. Further, FIG. 3B is an expanded view of an optical engine 3 and a light source unit 4 indicated by a circular line in FIG. 3A. As illustrated in FIGS. 3A and 3B, the image projection apparatus 1 includes, for example, the optical engine 3 and the light source unit 4. Further, FIG. 4 is a schematic cross-sectional view of the optical engine 3 and the light source unit 4. The optical engine 3 includes a lighting unit 3a used as an optical radiation system, and a projection unit 3b used as an optical projection system.

As illustrated in FIG. 3A, an air-intake fan 13 is disposed inside the air-intake port 11, and an exhaust fan 14 is disposed inside the exhaust port 12. The inside of the image projection apparatus 1 can be cooled by forced air draft, which can be generated by in-taking air from the air intake fan 13 and exhausting the air from the exhaust fan 14.

As to the image projection apparatus 1, light emitted (i.e., white light) from the light source 4a of the light source unit 4 is irradiated to the lighting unit 3a of the optical engine 3. In the lighting unit 3a, the irradiated white light is separated into red, green and blue (RGB) light, and then guided to an image generation element unit 10 by using the optical radiation system. The image generation element unit 10 generates an image based on modulated signals, and then the optical projection system such as the projection unit 3b enlarges and projects the generated image onto the screen 15.

The light source 4a of the light source unit 4 can employ various lamps such as an arc lamp (e.g., high pressure mercury lamp, xenon lamp). In this description, the light source 4a employs the high pressure mercury lamp. The light source 4a, which increases its luminance after the power supply is started, can be used for the one or more example embodiments.

Further, a cooling fan 16 is disposed at one side of the light source unit 4 as a cooling device for cooling the light source 4a. The rotation speed of the cooling fan 16 is controlled at a given speed level to maintain temperature of each parts of the light source unit 4 at a given temperature range. Further, an exit direction of light from the light source unit 4 and an exit direction of image light from the projection unit 3b are angled about 90-degree directions with each other as illustrated in FIG. 4.

Further, the lighting unit 3a of the optical engine 3 includes, for example, a color wheel 5, a light tunnel 6, a relay lens 7, a flat-face mirror 8, and a concave-face mirror 9. The color wheel 5 separates light emitted from the light source 4a. The light tunnel 6 guides the light exiting from the color wheel 5 to the optical radiation system, wherein the relay lens 7, the flat-face mirror 8 and the concave-face mirror 9 can be collectively used as the optical radiation system. Further, the lighting unit 3a includes the image generation element unit 10.

In the lighting unit 3a, the white light emitted from the light source 4a is sequentially converted into RGB light for each unit time by the color wheel 5 having a disk shape, and the converted light exits from the color wheel 5. Then, the converted light exiting from the color wheel 5 is guided to the light tunnel 6 having a cylindrical shape composed of glass plates.

Then, the light exiting from the light tunnel 6 is condensed by the relay lens 7 composed of two lenses while correcting chromatic aberration on the optical axis. Further, the light exiting from the relay lens 7 is reflected by the flat-face mirror 8 and the concave-face mirror 9, and is irradiated to the image generation element unit 10. The image generation element unit 10 includes, for example, a digital micro-mirror device (DMD) element 10a used as an image generation element. The DMD element 10a includes a plurality of micro mirrors shaping the mirror face as a rectangular shape. Each of the micro mirrors is time-divisionally driven based on image data, with which the micro mirrors reflect light to generate projection light used for generating a projection image.

Based on input signals, the image generation element unit 10 switches ON/OFF of the plurality of micro mirrors of the DMD element 10a to select light to be output to the projection unit 3b. Specifically, based on the time-divisional image data, the DMD element 10a having the plurality of micro mirrors reflects light used for projection (i.e., projection light) to a projection lens, and reflects light not used for projection to an OFF plate. The projection light reflects on the image generation element unit 10 toward the projection unit 3b, and then the projection light passing through a plurality of projection lenses in the projection unit 3b is enlarged and projected onto the screen 15.

Function of Image Projection Apparatus

Figure 5A:
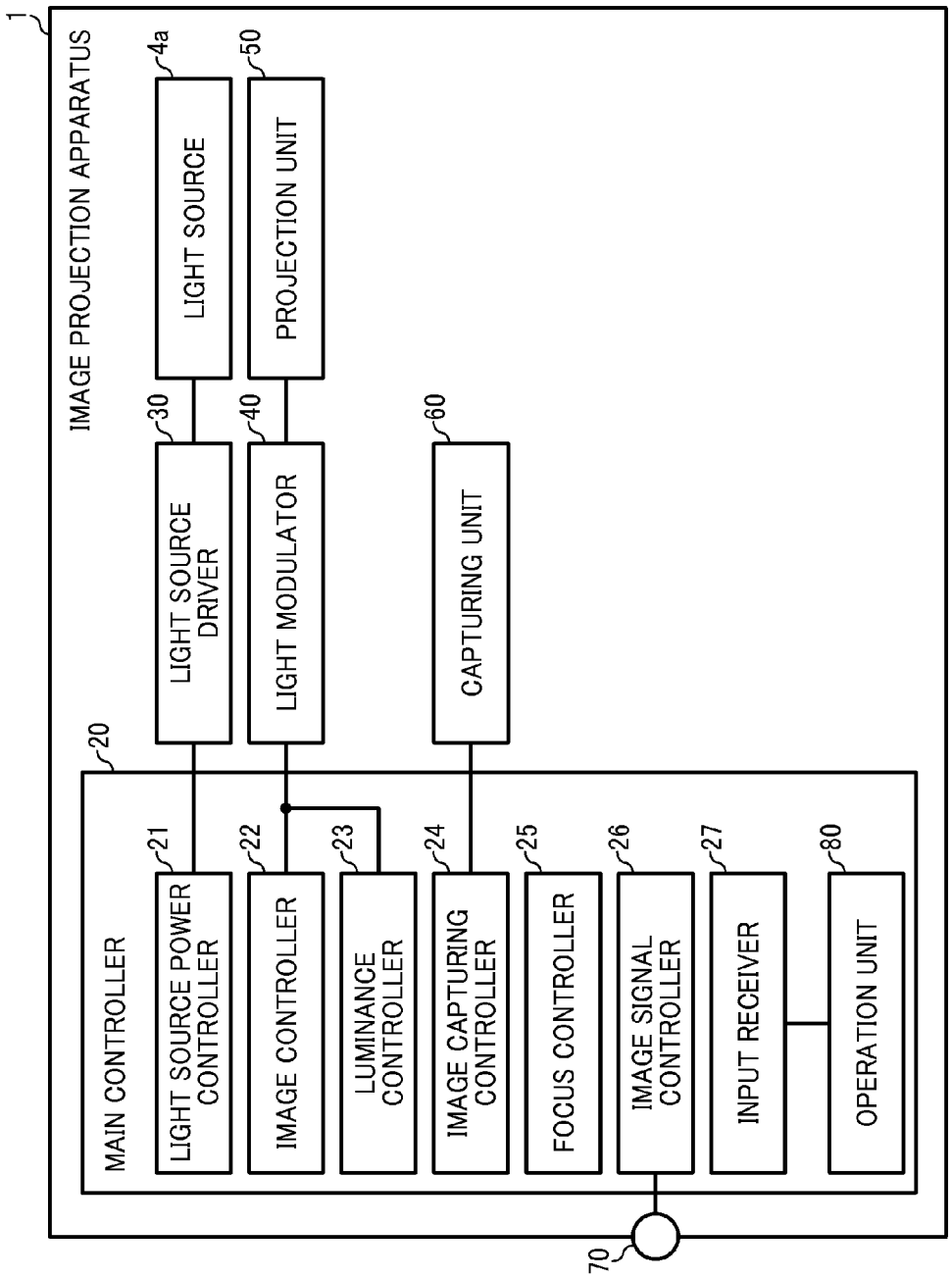
FIG. 5A is a functional block diagram of the image projection apparatus.

FIG. 5A is a functional block diagram of the image projection apparatus 1 for controlling power level for driving the light source 4a, and controlling luminance of a projection image. The image projection apparatus 1 includes, for example, a main controller 20, the light source 4a such as high pressure mercury lamp, a light source driver 30, a light modulator 40, a projection unit 50, a capturing unit 60, an input terminal 70, and an operation unit 80.

Further, the main controller 20 includes, for example, a light source power controller 21, an image controller 22, a luminance controller 23, an image capturing controller 24, a focus controller 25, an image signal controller 26, and an input receiver 27.

The light source 4a (e.g., high pressure mercury lamp) is composed of a pair of electrodes and light emission material (e.g., mercury), in which when electrical discharge occurs between the pair of electrodes, the light emission material emits light. The light source power controller 21 controls power level and waveform for driving the light source 4a (driving power level and driving waveform for driving the light source 4a), and the light source driver 30 drives the light source 4a based on the driving power level and driving waveform.

Under the control of the light source power controller 21, the light source driver 30 turns on light of the light source 4a under a given driving condition.

The light modulator 40 modulates intensity of light emitted from the light source 4a to generate an image such as a projection image. The light modulator 40 corresponds, for example, to the DMD element 10a in this description. The light emitted from the light source 4a enters the light modulator 40 via the color wheel 5, the light tunnel 6, the relay lens 7, the flat-face mirror 8, and the concave-face mirror 9.

The projection unit 50 is the optical projection system that enlarges and projects the projection image generated by the light modulator 40 on the screen 15.

The capturing unit 60 is an image capturing apparatus that captures the projection image projected on the screen 15. For example, the capturing unit 60 employs a charge coupled device (CCD) camera but not limited hereto. The capturing unit 60 can capture a pattern image, which is a projection image, used for the auto focusing control operation.

The input terminal 70 is an interface for receiving image signals. The input terminal 70 is a video input terminal such as video graphics array (VGA) input terminal such as D-Sub connector, and high-definition multimedia interface (HDMI: registered trademark) terminal, S-VIDEO terminal, and RCA terminal. The image projection apparatus 1 can receive image signals from an image supply apparatus such as a computer and audio-visual apparatus via the input terminal 70 connected to the image supply apparatus using cables. Further, the input terminal 70 includes a plurality of terminals.

The operation unit 80 is composed of, for example, a control panel including key buttons disposed on an outer face of the image projection apparatus 1. The operation unit 80 is used to receive various operation requests from a user. Upon receiving an operation request, the operation unit 80 reports the operation request to the input receiver 27 of the main controller 20. Further, the operation unit 80 can be configured to receive operation signals from a remote controller, and then the operation unit 80 reports the received operation signals to the input receiver 27.

The control panel and the remote controller include a power key button to turn on and off the power supply to the image projection apparatus 1, a menu key button for setting various information such as inputting of light source power, changing to energy save mode, a cross key, and an enter key.

The main controller 20 transmits and receives control signals with each of units in the image projection apparatus 1 to control the image projection apparatus 1 as a whole. Specifically, the main controller 20 includes. for example, a central processing unit (CPU) used as a main processor, a read only memory (ROM) storing various control programs and settings, a memory such as synchronous dynamic random access memory (SDRAM) to temporarily store data used for each processing, and a memory such as non-volatile RAM (NVRAM) to store data such as settings even when the power supply is OFF, wherein each of these units can be connected by a bus.

The light source power controller 21 controls the light source driver 30 that drives the light source 4a. Specifically, the light source power controller 21 controls a power level [W] for driving the light source 4a to the light source driver 30. Specifically, when the power supply to the image projection apparatus 1 is turned ON, a warming-up operation of the light source 4a is started, in which the light source power controller 21 instructs the light source driver 30 to increase the power level for driving the light source 4a until the power level becomes a given power level such as a power level for displaying an initial screen image to be used as the power level for driving the light source 4a upon completing the warming-up operation of the light source 4a. Further, after completing the warming-up operation of the light source 4a, the light source power controller 21 can control the light source driver 30 to set the power level for driving the light source 4a at a given level selected by a user such as a power level for a mode selected by the user.

Based on the control information transmitted from the luminance controller 23, the image controller 22 controls the light modulator 40. Further, the image controller 22 controls the light modulator 40 to project a pattern image used for the auto focusing control operation on the screen 15.

When the power supply to the image projection apparatus 1 is turned ON and then the power supply to the light source 4a starts to increase, the luminance controller 23 computes a condition to maintain brightness of a projection image at a substantially constant level at a given timing, and transmits the control information to the image controller 22 to control the light modulator 40 to maintain the brightness of the projection image at the substantially constant level.

When the condition is computed at the given timing, the light source 4a is required to be driven at least at a given power level or more so that the pattern image projected for the auto focusing control operation on the screen 15 can be captured with a brightness level that the auto focusing control operation can be performed.

The image capturing controller 24 controls the capturing unit 60 to capture the pattern image used for the auto focusing projected control operation onto the screen 15.

Based on image data of the auto-focusing pattern image captured by the capturing unit 60, the focus controller 25 performs computation and control of the optical system for the auto focusing control operation such as computing an adjustment amount of a focus ring when performing the auto focusing control operation. For example, based on the computed adjustment amount of the focus ring, the focus controller 25 controls a rotation of the focus ring. The auto focusing control operation can be performed based on a captured image of the pattern image using known methods.

The image signal controller 26 processes image signals input to the input terminal 70 of the image projection apparatus 1. For example, the image signal controller 26 performs various processing such as serial-parallel conversion and voltage level conversion to the image signals. Further, the image signal controller 26 has a signal determination capability that analyzes resolution and frequency of the image signals. After performing various processing to the image signals, the image signal controller 26 transfers the image signals to the image controller 22.

The input receiver 27 receives various operations such as power-supply ON/OFF operation of the image projection apparatus 1 and a change of projection modes from a user via the operation unit 80.

Figure 5B:
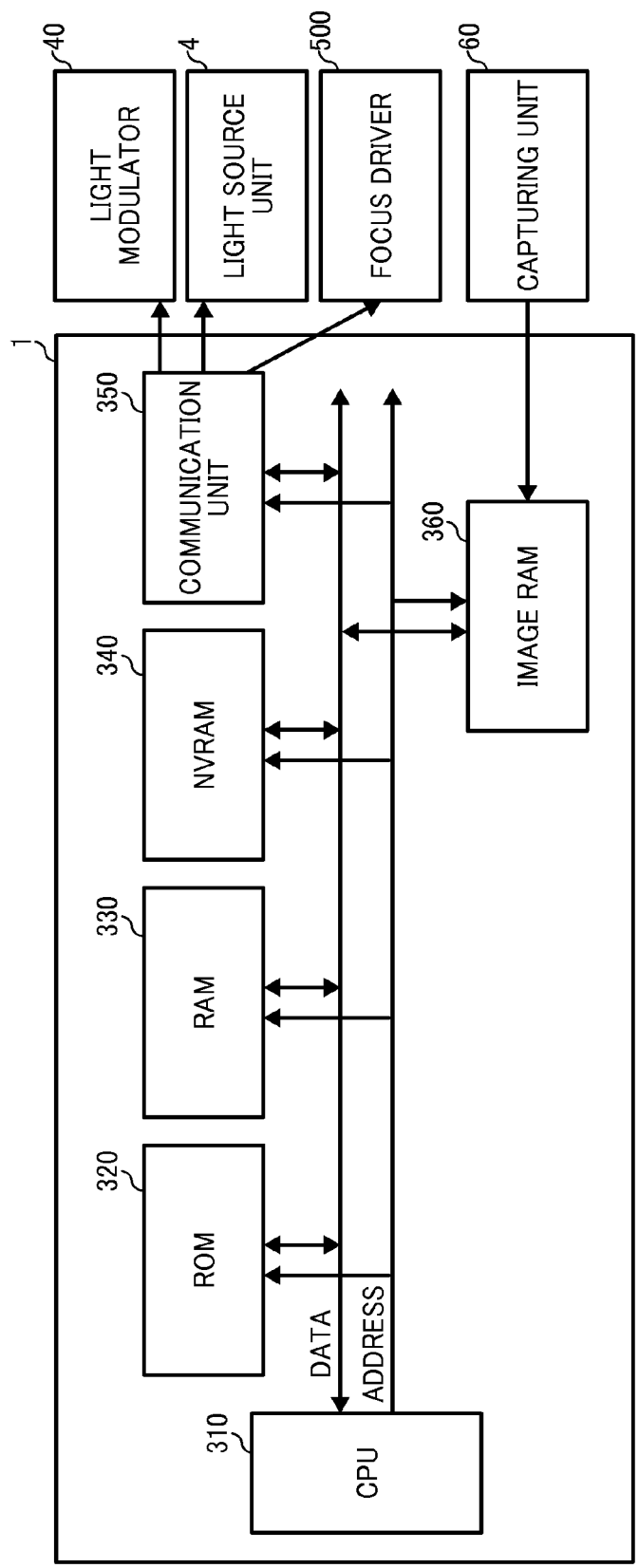
FIG. 5B is an example of a hardware configuration of a control system of the image projection apparatus.

FIG. 5B is an example of a hardware configuration of a control system of the image projection apparatus 1. The control system of the image projection apparatus 1 includes, for example, a central processing unit (CPU) 310, a read only memory (ROM) 320, a random access memory (RAM) 330, a non-volatile random access memory (NVRAM) 340, a communication unit 350, and an image random access memory (image RAM) 360. The ROM 320 stores programs executable by the CPU 310. The RAM 330 is used as a working memory when executing the programs. The NVRAM 340 is a non-volatile memory that stores various settings and data of the image projection apparatus 1 such as focus adjustment data, and can store data even when a power supply is shutdown. The communication unit 350 is used to transmit computation results of the CPU 310 to the light modulator 40 such as the image generation element unit 10 including the DMD element 10a, the light source unit 4, and a focus driver 500. The image RAM 360 temporarily stores image data acquired by the capturing unit 60. Each of these units of the control system can be implemented by executing programs and data stored in the ROM 320. The control system can be devised as a hardware or a combination of software and hardware. Specifically, image data acquired by the DMD element 10a can be stored in the image RAM 360, and the CPU 310 executes the programs stored in the RAM 330 to implement various processing such as changing the power level for driving the light source 4a, controlling of the DMD element 10a, and auto focusing operation.

Control of Brightness of Projection Image

FIG. 6 is a flow chart showing the steps of a process of controlling the auto focusing control operation during the warming-up mode of the image projection apparatus 1 while maintaining brightness of projection image at a substantially constant level.

Figure 7A:
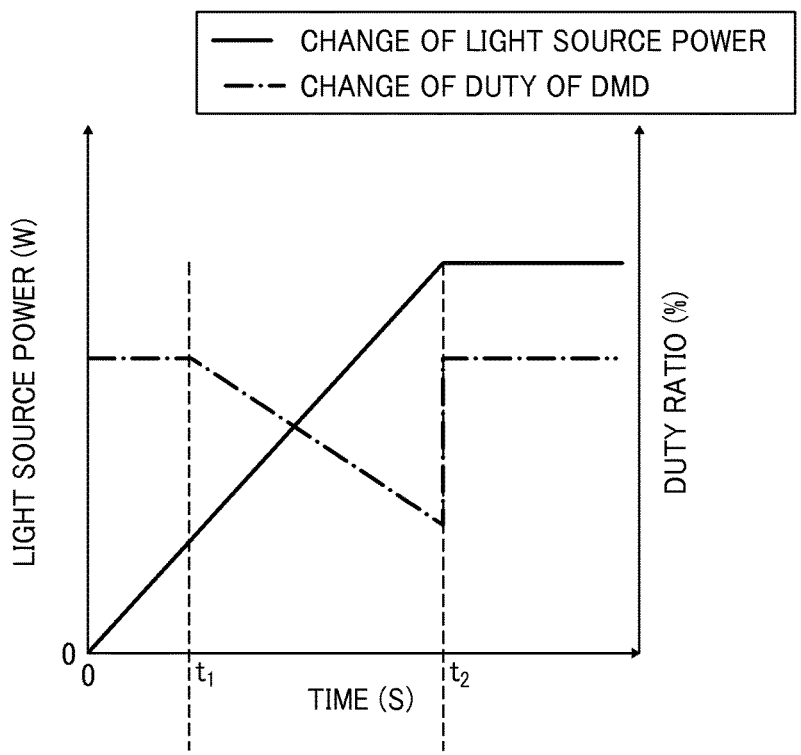
FIG. 7A is a graph indicating a relationship of light source power and duty ratio of a DMD element used for controlling brightness of projection image.
Figure 7B:
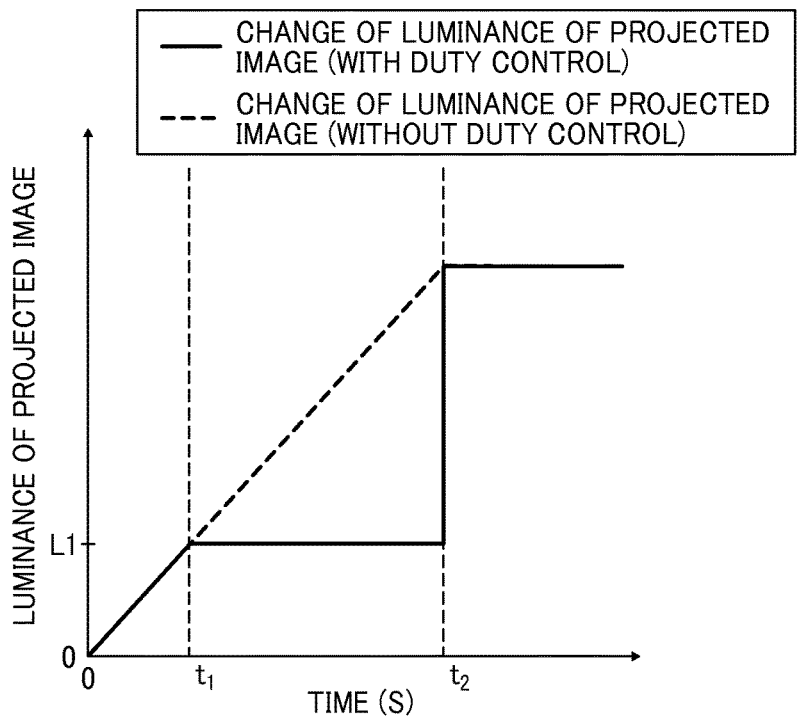
FIG. 7B is a graph indicating a change of brightness of projection image when brightness of projection image is being controlled as shown in FIG. 7A.

FIG. 7A is a graph indicating a relationship of power levels [W] for driving the light source 4a and duty ratio [%] of the DMD element 10a used for controlling the brightness of projection image. FIG. 7B is a graph indicating a change of the brightness of projection image when the brightness of projection image is being controlled as indicated in FIG. 7A.

Herein after, the power level for driving the light source 4a may be referred to light source power for the simplicity of expression.

When a user operates the operation unit 80 to set a power-supply ON of the image projection apparatus 1, the input receiver 27 receives the power-supply ON instruction, and the image projection apparatus 1 is supplied with power and activated (S101).

The light source power controller 21 controls the light source driver 30 to increase the light source power during the warming-up mode until the power level for driving the light source 4a becomes a given power level such as a power level for displaying an initial screen (S102).

When a given time elapses after starting S102, the control of the duty ratio of the DMD element 10a, which can be referred to DMD control operation, is started to maintain the brightness of projection image at a substantially constant level. (S103).

The process of S103 can be started when the light source power becomes a given value, or at a time point when the light source power starts to increase. It should be noted that the auto focusing control operation can be performed with a condition that luminance of light emitted from the light source 4a when starting the control of the duty ratio of the DMD element 10a becomes a level that can project a pattern image with brightness enough to capture the pattern image effectively.

The change of the duty ratio of the DMD element 10a means changing ON-time of a pixel which is activated as an ON-pixel in the ON/OFF duty control of the micro mirrors composing the DMD element 10a. Specifically, by decreasing the duty ratio of the DMD element 10a, a gradation value of each of pixels included in image data, which is original data for a projection image, can be decreased.

For example, when the light source power becomes a given power such as 150 W at time "t1" (FIG. 7A), the control of the duty ratio of the DMD element 10a is started, and the control of the duty ratio of the DMD element 10a is being continued until the light source power becomes another given power such as 250 W at time "t2" (FIG. 7A). If the duty ratio of the DMD element 10a at 150 W is set 100%, the duty ratio is being decreased from 100% until the light source power becomes 250 W to offset the increased brightness of projection image caused by the increase of the light source power. With this configuration, the brightness of projection image, obtained by the light source power of 150 W and the duty ratio of 100%, can be maintained on the projection face during the warming-up mode as indicated in FIG. 7B.

If the process of S103 is not performed, the brightness of projection image becomes gradually brighter during the warming-up operation as the time elapses because the power level for driving the light source 4a increases, which is not preferable for the auto focusing control operation. Therefore, the image controller 22 controls the image generation element unit 10 based on the control information from the luminance controller 23 to maintain the brightness of projection image at a substantially constant level. (i.e., the brightness of projection image is not changed substantially). Specifically, the duty ratio of the DMD element 10a is decreased gradually.

Then, while the brightness of projection image is being maintained at the substantially constant level., the image controller 22 projects the pattern image used for the auto focusing control operation on the projection face, the capturing unit 60 captures the pattern image projected on the projection face, and then the focus controller 25 computes a control value of the auto focusing control operation based on data of the pattern image captured by the capturing unit 60, and controls a focus lens based on the control value computed for the auto focusing control operation to execute the auto focusing control operation (S104). The process of S104 is performed at any timing between time "t1" and "t2" (FIG. 7A).

When the auto focusing control operation is completed (S105: YES), and the light source power is increased to a given power level for driving the light source 4a such as 250 W at time "t2" indicated in FIG. 7A (S106: YES), the control of the DMD element 10a performed by the luminance controller 23 and the image controller 22 is completed, and the operation of the image projection apparatus 1 returns to the normal operation, in which the operation returns, for example, to an operation before decreasing the duty ratio, or an operation performed by using a given duty ratio when the image projection apparatus 1 is activated (S107). With this configuration, the brightness of projection image becomes brighter very quickly, and the projection image is displayed with the brightness matched to a normal power level of the light source (S107). Further, when the auto focusing control operation is completed (S105: YES), the control of the DMD element 10a can be returned to the normal operation even if the light source power is not yet increased to the given driving power level.

In FIG. 7A, the horizontal axis represents time line, in which "0" indicates a time point when the power supply to the image projection apparatus 1 is started (i.e., power-ON of the image projection apparatus 1). Further, the solid line indicates a profile of a change of the light source power [W] of the light source 4a, and the one-dot chain line indicates a profile of the duty ratio [%] of the DMD element 10a.

As illustrated in FIG. 7A, when the power supply to the image projection apparatus 1 is set ON at time "0," the light source power starts to increase. When the light source power becomes a given level at a given time point such as time "t1" in FIG. 7A by increasing the light source power, the control of the duty ratio of the DMD element 10a is started from time "t1," and the duty ratio of the DMD element 10a is gradually decreased until another time point such as time "t2" in FIG. 7A, at which the increase of the light source power is completed.

In this configuration, time "t1" and time "t2," and light source power at time "t1" and time "t2" can be set any values but the brightness of projection image at time "t1" is required to be at a level that the auto focusing control operation can be performed. Further, the control of the duty ratio of the DMD element 10a can be completed when the auto focusing control operation is completed, or when the increase of the light source power is completed.

FIG. 7B indicates a change of the brightness of projection image when the duty ratio of the DMD element 10a is controlled as indicated in FIG. 7A. When the power supply to the image projection apparatus 1 is started (power-ON) at time "0," the brightness of projection image continues to increase until time "t1" because the light source power starts to increase.

Then, the duty ratio of the DMD element 10a is gradually decreased from time "t1" to maintain the brightness of projection image at a substantially constant level L1 until time "t2" as indicated by the solid line in FIG. 7B. By contrast, the dot linen FIG. 7B indicates a profile of the brightness of projection image without performing the DMD control operation, in which the brightness of projection image continues to increase as the light source power increases.

When the DMD control operation to maintain the brightness at the substantially constant level L1 is completed at the time "t2" as illustrated in FIG. 7B, the duty ratio of the DMD element 10a is returned to a given value. The given value means, for example, the duty ratio for projecting an initial screen image. FIG. 7A shows an example case that the duty ratio is returned to the duty ratio set before time "t1" after the DMD control operation is completed at time "t2." When the operation mode shifts to the normal operation mode as above described, as indicated in FIG. 7B, the brightness of projection image returns to normal brightness based on a power level for driving the light source.

As above described, the brightness of projection image can be maintained at the substantially constant level during the DMD control operation such as from time "t1" to time "t2" (FIG. 7B), and further, the auto focusing control operation is performed from the time "t1" to "t2." As shown in FIG. 7B, the brightness of projection image is ideally controlled at the constant level, but some level of fluctuation can be occurred to the brightness of projection image.

As to the above described image projection apparatus, when the power supply to the image projection apparatus 1 is started (i.e., power-ON of the image projection apparatus 1) and the light source power starts to increase, the brightness of projection image continuously increases, and then the light modulator 40 is started to be controlled to suppress the increase of the brightness of projection image even if the light source power increases. Specifically, the light modulator 40 is controlled to offset the increase of the light source power so that fluctuation of the brightness of projection image projected on the projection face is suppressed or prevented, with which the brightness of projection image can be maintained at the substantially constant level.

As to the image projection apparatus of one or more example embodiments, after the power supply to the image projection apparatus 1 is started, the projection image can be projected while maintaining the brightness of projection image at a lower level compared to a normal brightness level by controlling the light modulator during the warming-up mode. When the warming-up mode is completed, the control of the light modulator is returned to the normal operation, and then the image can be projected with a normal brightness level obtained by the normal driving power level, which is set after completing the warming-up mode of the light source.

In the above described configuration, when the auto focusing control operation or adjustment operation is performed while projecting the pattern image, and capturing the pattern image during the warming-up mode, the auto focusing control operation or adjustment operation can be performed without fluctuation of the brightness of the pattern image (i.e., the brightness of the pattern image is maintained at the substantially constant level), in which the image capturing unit can capture the pattern image under a condition that the brightness of the pattern image is maintained at the substantially constant level, and thereby the auto focusing control operation or adjustment operation can be performed effectively.

In the above described configuration, the duty ratio of the DMD element 10a for offsetting the increase of the light source power is set in advance, but not limited hereto. For example, the image projection apparatus 1 can preferably include a first detector such as an illuminance sensor to detect illuminance of a projection image projected on the screen 15 and/or a second detector such as a luminance sensor to detect luminance of a projection image being output from the projection unit 3b of the image projection apparatus 1, and the DMD element 10a can be preferably controlled based on a value detected by at least one of the detectors. With this configuration, the DMD element 10a can be controlled more correctly (i.e., the duty ratio of the DMD element 10a for offsetting the increase of the light source power can be set more correctly) based on the illuminance of projection image viewed by a user, and/or the luminance of the projection image output from the image projection apparatus 1.

Further, in the above described configuration, the luminance controller 23 and the image controller 22 control the light modulator but not limited hereto. For example, instead of the light modulator, the luminance controller 23 and the image controller 22 can adjust an aperture level of the optical system including as the projection system and the lighting system when the light source power is being increased while maintaining the brightness of projection image at a substantially constant level. When the aperture adjustment is performed, gradation values can be preferably maintained (i.e., gradation values do not become narrower), which is different from the control of the light modulator that decreases the maximum value of gradation. Further, as to the control of the light modulator, it becomes difficult to suppress the increase of brightness of black as the light source power is increased. As to the adjustment operation of aperture level, the brightness of black can be preferably suppressed at the substantially constant level based on the aperture level. Further, in another configuration, both of the gradation value and aperture level of the optical system can be controlled.

Further, when the light source power is increased to the given driving power level such as normal driving power level, the brightness of projection image is returned to the normal level (time "t2" in FIG. 7B) very quickly, which means the projection image becomes brighter very quickly. The luminance controller 23 and the image controller 22 can preferably control the duty ratio of the DMD element 10a to increase the brightness of projection image gradually brighter, in which the luminance controller 23 and the image controller 22 increase the duty ratio of the DMD element 10a gradually, with which a user may not feel uncomfortable brightness change of the projection image.

In the above described example embodiments, the image projection apparatus employs the DMD as the light modulator, and the duty of DMD is decreased, but not limited hereto. Further, the above described example embodiments can be applied to other image projection apparatuses employing a liquid crystal such as liquid crystal display (LCD) and reflection liquid crystal such as liquid crystal on silicon (LCOS; registered trademark) as the light modulator. When the liquid crystal is employed, the light modulator can be controlled as follows. For example, voltage applied to the liquid crystal is changed to vary the orientation of liquid crystal molecular, and then transmittance of the liquid crystal display including polarization filters sandwiching the liquid crystal layer is changed, with which the brightness of image to be displayed can be changed.

Further, each of the light source power controller 21, the image controller 22, the luminance controller 23, the image capturing controller 24, the focus controller 25, the image signal controller 26, and the input receiver 27 of the main controller 20 can be implemented by, for example, executing software such as control program of the image projection apparatus 1 by the CPU of the main controller 20.

The above described image projection apparatus can suppress or prevent fluctuation of the brightness of projection image when the image projection apparatus is in the warming-up mode.

The present invention can be implemented in any convenient form, for example using dedicated hardware platform, or a mixture of dedicated hardware platform and software. Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The computer software can be provided to the programmable device using any storage medium or carrier medium such as non-volatile memory for storing processor-readable code such as a floppy disk, a flexible disk, a compact disk read only memory (CD-ROM), a compact disk rewritable (CD-RW), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a flash memory, Blu-ray disc (registered trademark), SD card, a solid state memory device or the like, but not limited these. Further, the computer software can be provided through communication lines such as electrical communication line. Further, the computer software can be provided in a read only memory (ROM) disposed for the computer. The computer software stored in the storage medium can be installed to the computer and executed to implement the above described processing. The computer software stored in the storage medium or apparatus of an external apparatus can be downloaded and installed to the computer via a network to implement the above described processing.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C, C++, C#, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus or image projection apparatus using a computer-readable program, which can execute the above-described processes or steps. In the above-described embodiments, at least one or more of the units of apparatus can be implemented as hardware or as a combination of hardware/software combination. Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image projection apparatus comprising:
   a light source to emit light;
   a light modulator to modulate intensity of the light emitted from the light source for generating a projection image; and
   an image luminance controller to control the light modulator to maintain brightness of the projection image projected on a projection face at a substantially constant level during a given time period of the image projection apparatus, the given time period being from one time point when power supply to the image projection apparatus is started to another time point when a power level for driving the light source is increased to a given power level.

2. The image projection apparatus of claim 1, further comprising:
   an image capturing unit to capture a pattern image used for an auto focusing control operation projected on the projection face; and
   a focus controller to perform an auto focusing control operation based on the pattern image captured by the image capturing unit during the given time period while the brightness of the projected pattern image is being maintained at the substantially constant level.

3. The image projection apparatus of claim 1, wherein the image luminance controller controls the light modulator to decrease a gradation value of one or more pixels included in original image data so that the brightness of the projection image is maintained at the substantially constant level during the given time period.

4. The image projection apparatus of claim 3, wherein the light modulator is a digital micro-mirror device (DMD), wherein the image luminance controller gradually decreases a duty ratio of the light modulator when a power level for driving the light source is being increased during the given time period, and returns the decreased duty ratio to a given duty ratio when the given time period ends.

5. The image projection apparatus of claim 1, wherein the image luminance controller controls an aperture level of an optical system of the image projection apparatus so that the brightness of the projection image is maintained at the substantially constant level during the given time period.

6. The image projection apparatus of claim 2, wherein the image luminance controller completes a control of maintaining the brightness of the projection image at the substantially constant level when the auto focusing control operation is completed.

7. The image projection apparatus of claim 1, wherein the image luminance controller completes a control of maintaining the brightness of projection image at the substantially constant level when the power level for driving the light source is increased to the given power level.

8. The image projection apparatus of claim 1, wherein the image luminance controller controls the light modulator to increase the brightness of the projection image gradually when the power level for driving the light source is increased to the given power level.

9. The image projection apparatus of claim 1, further comprising at least one of a first detector to detect illuminance of the projection image projected on the projection face, and a second detector to detect luminance of the projection image output from the image projection apparatus, wherein the image luminance controller controls the light modulator based on at least one of a first detection result detected by the first detector and a second detection result detected by the second detector.

10. A method of controlling an image projection by an image projection apparatus comprising the steps of:
emitting light from a light source;
modulating intensity of the light emitted from the light source for generating a projection image; and
controlling brightness of the projection image projected on a projection face at a substantially constant level during a given time period of the image projection apparatus, the given time period being from one time point when power supply to the image projection apparatus is started to another time point when a power level for driving the light source is increased to a given power level.

11. A non-transitory computer-readable storage medium storing a program that, when executed by a computer, causes the computer to execute a method of controlling an image projection by an image projection apparatus comprising the steps of:
emitting light from a light source;
modulating intensity of the light emitted from the light source for generating a projection image; and
controlling brightness of the projection image projected on a projection face at a substantially constant level during a given time period of the image projection apparatus, the given time period being from one time point when power supply to the image projection apparatus is started to another time point when a power level for driving the light source is increased to a given power level.

* * * * *